(12) United States Patent
Polyakov

(10) Patent No.: US 6,690,286 B2
(45) Date of Patent: *Feb. 10, 2004

(54) SYSTEM OF ADVERTISING

(76) Inventor: Leonid Polyakov, 1 Shetland Ct., Dix Hills, NY (US) 11746

( * ) Notice: Subject to any disclaimer, the term of this patent is extended or adjusted under 35 U.S.C. 154(b) by 23 days.

This patent is subject to a terminal disclaimer.

(21) Appl. No.: 10/186,565

(22) Filed: Jun. 24, 2002

(65) Prior Publication Data

US 2002/0167416 A1 Nov. 14, 2002

Related U.S. Application Data

(62) Division of application No. 09/760,740, filed on Jan. 17, 2001, now Pat. No. 6,414,602.

(51) Int. Cl.[7] .................................................. G08B 3/00
(52) U.S. Cl. ..................................... 340/691.6; 340/988
(58) Field of Search ............................. 340/691.6, 901, 340/902, 904, 988, 991, 994, 905; 701/200, 204, 213

(56) References Cited

U.S. PATENT DOCUMENTS

| | | | | |
|---|---|---|---|---|
| 4,541,119 A | * | 9/1985 | Cooper et al. | 340/905 |
| 6,006,159 A | * | 12/1999 | Schmier et al. | 340/988 |
| 6,307,573 B1 | * | 10/2001 | Barros | 345/764 |
| 6,414,602 B2 | * | 7/2002 | Polyakov | 340/691.6 |

FOREIGN PATENT DOCUMENTS

| | | | | |
|---|---|---|---|---|
| JP | 09244566 A | * | 9/1997 | |
| JP | 10075220 A | * | 3/1998 | |
| JP | 11280619 | * | 9/1999 | |
| JP | 2001280981 A | * | 10/2001 | |
| JP | 2002063482 A | * | 2/2002 | |

* cited by examiner

Primary Examiner—Van Trieu
(74) Attorney, Agent, or Firm—I. Zborovsky

(57) ABSTRACT

A system of advertising has a source of advertising information adapted to transmit advertising information of different contents substantially corresponding to objects to be advertised situated in different advertising zones and formed as a server unit, a plurality of moving vehicles, each of the vehicle being provided with a receiver for receiving the advertising information of different contents, each of the vehicles being provided with further unit for receiving a signal, which does not contain a geographical information, each of the vehicles being provided with a display for displaying advertising information, and the server unit determining a zone in which the vehicle is located and therefore a geographic information and to transmit to the further receiving unit of the vehicle the signal does not contain the geographic information without transmitting the geographical information, while the receiver in each of the vehicle is formed so as to select in a vehicle based on the signal and to display an advertising information corresponding to the signal with a content which thereby corresponds to the determined zone.

6 Claims, 2 Drawing Sheets

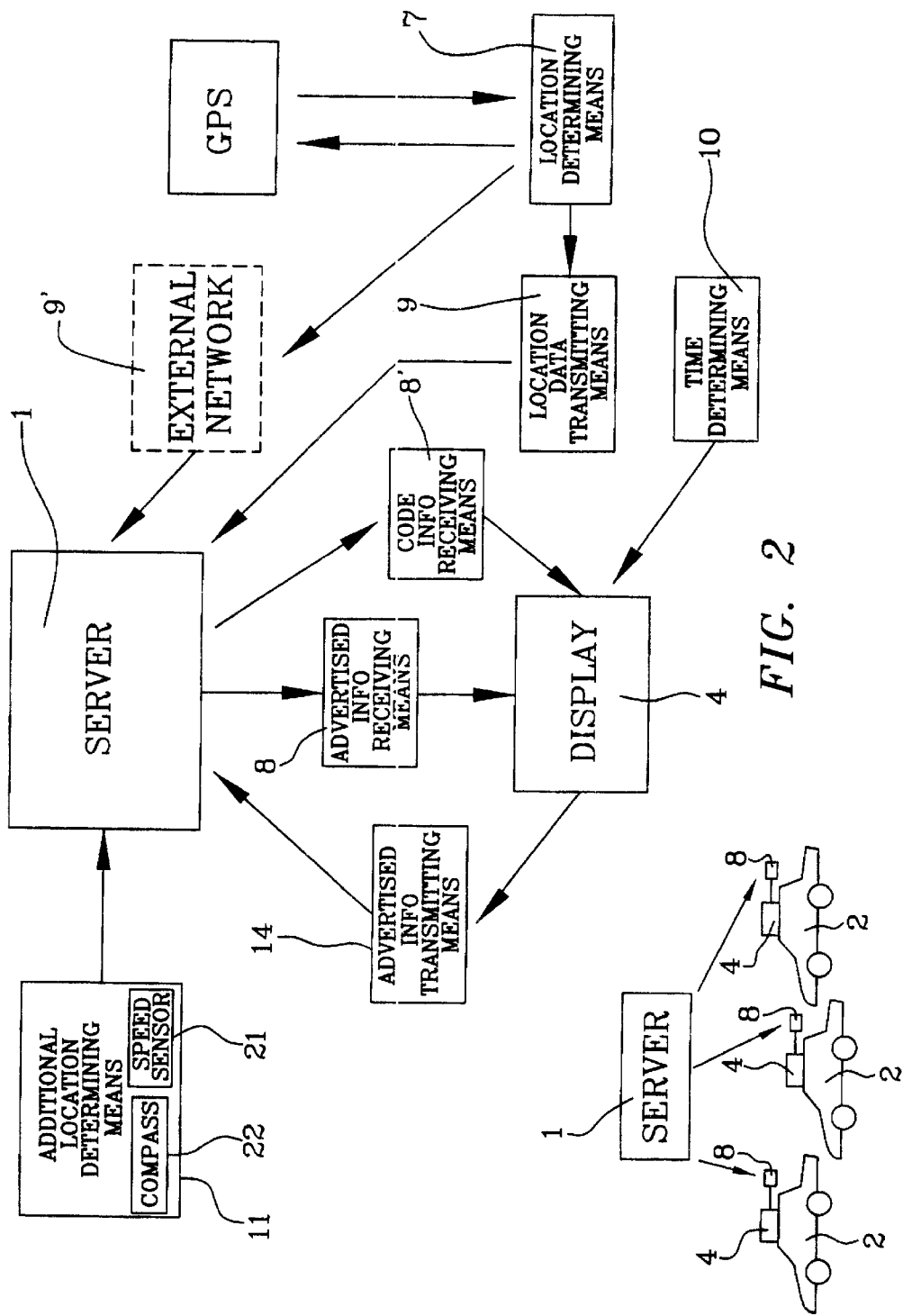

SYSTEM OF ADVERTISING

CROSS-REFERENCE TO A RELATED APPLICATION

This application is a divisional of patent application Ser. No. 09/760,740 filed on Jan. 17, 2001, now U.S. Pat. No. 6,414,602.

BACKGROUND OF THE INVENTION

The present invention relates to a system for advertising, in particular with the use of moving vehicles.

Advertising with view of the moving vehicles is known in the art, in particular the moving vehicles have displays which display corresponding advertising materials. However, these advertising materials are not specific to a zone of the moving vehicle. However, it is very important to display a corresponding advertising information at a zone when it will be most efficient.

Some of such systems are disclosed in U.S. Pat. Nos. 5,717,374; 5,914,654; 5,729,214; 5,627,549; 5,808,565; 5,214,793; 5,767,795; 5,664,948; 5,218,629; 5,963,280; 5,878,369; 6,00993; 6,122,850; as well as European patent document EP 0349470. U.S. Pat. No. 6,060,993 discloses a mobile display system in which a controller is associated with the vehicle and operatably connected to a display so as to drive the display to generate a message, means operably connected to the controller generate signals indicative of the geographic location of the vehicle, and the controller receives the signals indicative of the geographic location of the vehicle and determining when the vehicle enters a different zone to display a different message. In this system the controller associated with the vehicle generates signals indicative of the geographic location of the vehicle and drive the display to generate a message in correspondence with the geographic zone of the vehicle. The system can be further improved so that it is not necessary for a controller associated with a vehicle to specifically control the display in the above mentioned manner.

SUMMARY OF THE INVENTION

Accordingly, it is an object of present invention to provide a system of advertising, which avoids the disadvantages of the prior art.

In keeping with these objects and with others which will become apparent hereinafter, one feature of present invention resides, briefly stated, in a system of advertising, comprising a source of advertising information adapted to transmit advertising information of different contents substantially corresponding to objects to be advertised situated in different advertising zones and formed as a server means; a plurality of moving vehicles, each of said vehicles being provided with a receiver for receiving the advertising informations of different contents, each of said vehicles being provided with further means for receiving a signal which does not contain a geographical information, each of said vehicles being provided with a display for displaying advertising information, and said server means being formed so as to determine a zone in which the vehicle is located and therefore obtain a geographic information and to transmit to said further receiving means of the vehicle said signal which does not contain the geographic information without transmitting the geographical information, while said receiver in each of said vehicles is formed so as to select in a vehicle based on said signal and to display on said display an advertising information corresponding to said signal with a content which thereby corresponds to the determined zone.

When the system of advertising is designed in accordance with the present invention, then a signal is submitted to the vehicle from the server in correspondence with the determined zone which signal does not contain a geographical information, but only provides selection in the vehicle and displaying on the vehicle display an advertising information corresponding to the zone of determined location, and the advertising is performed in a corresponding zone, in which the advertising is most meaningful and efficient.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a view schematically showing a system for advertising in accordance with the present invention;

FIG. 2 is a view showing a vehicle of the inventive system with corresponding means;

DESCRIPTION OF PREFERRED EMBODIMENTS

Figure 3:
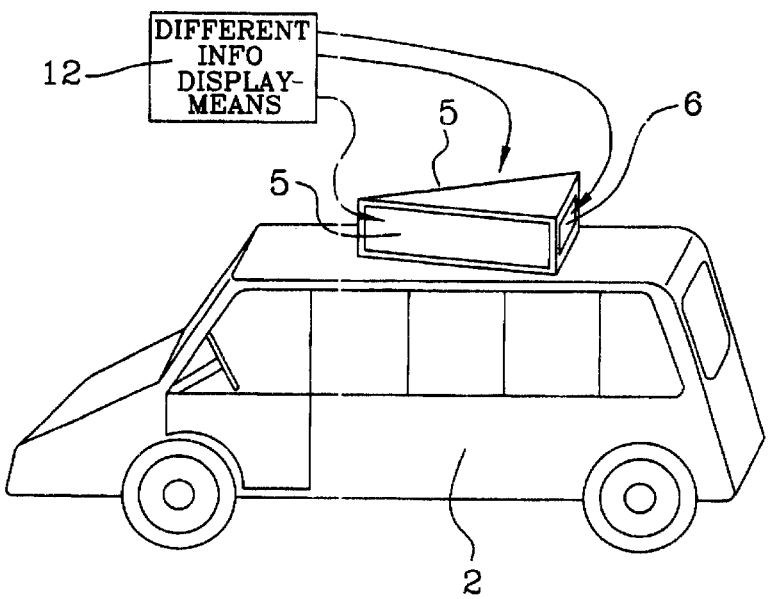
FIG. 3 is a view schematically showing a display which is used on the vehicle.

A system of advertising in accordance with the present invention has a source of advertising information which is identified as a whole with reference numeral 1 and formed as server means. It stores advertising informations of different types. In particular, it can store advertising informations which are different in correspondence with a plurality of zones, which vehicles will pass during driving. The informations of different types can be informations about businesses located at corresponding different zones, for example different movie theaters, different restaurants, different museums, etc. On the other hand, the information can be based on an opposite principle: at a zone of one business, an information about a competitor's business will be displayed. The different informations can be also informations on different languages formed so that an advertising information in Spanish will be advertised in a geographical zone with the Spanish population, an advertising information in French will be exhibited in France, etc. Also, other types of different informations are possible which are designed in correspondence with different zones. Generally the different types of information differ from one another by their different content. The server means 1 transmit to the vehicle in advance a plurality of different advertising informations.

Each vehicle 2 is provided with various means for functioning within the inventive advertising system. Each vehicle is provided with a display identified with reference numeral 4. As shown in FIG. 3 the display can have a substantially polygonal shape and can be provided with three screens including side screens 5 and a rear screen 6, as will be explained herein below. The displays can be arranged on top, sides, rear, front, etc. of the vehicle. Each vehicle 2 is provided with means for allowing determination of a location of the vehicle, identified with reference numeral 7. The location determination allowing means which operates automatically can operate in conjunction with a Global Positioning System or with any other system. The main function of the location determining means 7 is to allow determination of the location of the vehicle in particular time moment.

Each vehicle 2 further has an advertising information receiving means identified with reference numeral 8. The advertising information receiving means can be formed as a wireless or a wire-based receiver which is adapted to receive the advertising information from the server means 1. Each vehicle is further provided with transmitting means identified with reference numeral 9 which transmit information from the location determination allowing means 7 to the server means 1 about the determined location of the vehicle with the use of a GPS system. The means 7 contain a GPS receiver or another element which determines the location, and the location information is transmitted by the location data transmitting means 9 to the server means 1.

It is also possible to use a different approach, in accordance with which an external network 9' cooperates with the location determination allowing means 7, determines the location of the vehicle, and transmits the location data to the server means 1. When the server means 1 receives the information from the external network 9' about the location of the vehicle, the server means 1 determine a zone in which the vehicle is located and transmit to the advertising information receiving means 8' which is operably connected to the display 4 the corresponding control information. For example, in the server and in the receiving means 8, the advertising informations can be classified in accordance with codes, numbers, etc. Therefore, in response to the determination of the zone in which the vehicle is located by the server means 1, the server means 1 send a signal which does not carry advertising information but provides a selection of the corresponding advertising information. Thereby, on the display 4 only the advertising information which corresponds to the determined zone is displayed. For example when a vehicle passes a zone in which there is a Chinese restaurant, on the display an advertising information about the Chinese restaurant will be displayed, also either in English or in Chinese.

Each vehicle further has a time determining means identified with reference numeral 10, which can be formed for example as a computer clock. A signal from the time determining means 10 is supplied to the display, and on the display the advertising information in correspondence with the specific time is displayed. For example, an advertising information about a movie which is now played in a neighborhood movie theater will be displayed when the vehicle moves in the neighborhood. Another type of information can be an information about a radio program which is now being broadcast in the corresponding zone.

In addition to a purely advertising information, the server means 1 can store information about news and transmit it to the receiving means 8, so that the news are also displayed on the display 4. In addition the news can be displayed selectively in correspondence with the location determined by the location determining means or the external network 9' and the zone determined by the server means. For example, the news can be displayed in Chinese when the vehicle passes a Chinese-speaking neighborhood.

As mentioned herein above, the location determination allowing means can be formed so that they work in conjunction with a Global Positioning System. It is also possible that they work in conjunction with another system. As for the global positioning system, it is well known that in some areas which are substantially enclosed a Global Positioning System or other systems do not operate sufficiently. In connection with this, the vehicle 2 can be provided with additional location determining means 11. Such additional location determining means 11 are means which are exclusively vehicle-based and do not interact with external systems and can include a speed or acceleration sensor 21 and a compass 22. When for example one location of the vehicle is determined with the help of the Global Positioning System or another external system and then the vehicle moves to another, substantially enclosed location, the speed or acceleration sensor which senses the speed or acceleration and the compass which senses the direction will produce corresponding signals, and a board computer receives the signal and determines a next location which is reached by the vehicle and supplies a corresponding signal to the server means 1 which determines a zone in which the vehicle is located.

The display can be formed as a liquid crystal display, or can be based on light emitting diodes, plasma-type display, or can have another construction. In accordance with the invention, a display can have adjustable brightness, in dependence on an ambient illumination. For this purpose, a display can have an illumination intensity sensor, and an executing mechanism connected with the illumination intensity sensor and automatically changing the brightness of the display, depending on the changing ambient illumination intensity.

As shown in FIG. 3, the display can have a plurality, for example three screens including two side screens and one rear screen. Means can be provided, as identified with reference numeral 12, which can provide a display of different types of information on different screens. In particular on the rear screen which is visible by a driver of a vehicle which moves rearwardly in traffic can be provided with information which is non distracting, for example stationary information or information about traffic rules, etc., while the screens 5 and 6 can display information containing moving images at high speed. In accordance with still another feature of present invention, the display can be connected with a speedometer of the vehicle 2 and operate so that when the vehicle is immovable or moves with a slow speed the speed of the advertising information is higher, while when the speed of the vehicle increases, the speed of displaying of advertising information is slower to reduce attraction of traffic participants to the displayed information and to prevent accidents. Also the information can change only when the vehicle stops or moves with a lower speed, while at the higher speed the advertising information on the display can be immovable.

The display 4 can be formed so that it displays of the advertising information within a predetermined time period in correspondence with the time of the day and zone in which the vehicle is located, for example.

In accordance with a further feature of present invention, each vehicle can have additional transmitting means 14 operative for transmitting an information about the type of information displayed, the time of displaying the information, back to the same or to an additional source 1. As a result, the efficiency of the advertising information can be determined when the type and the display time of the corresponding information is known, and actual changes in consumer behavior with respect to an object of the advertising information have been determined as well. For example, it can be determined in this way how the advertising information helps to increase sales of tickets for movies in a corresponding movie theater. This feedback can be based for example on the use of a cellular telephones which receive the information from the source 1 in the vehicle, and also transmit the information from the vehicle to the source.

Figure 4:
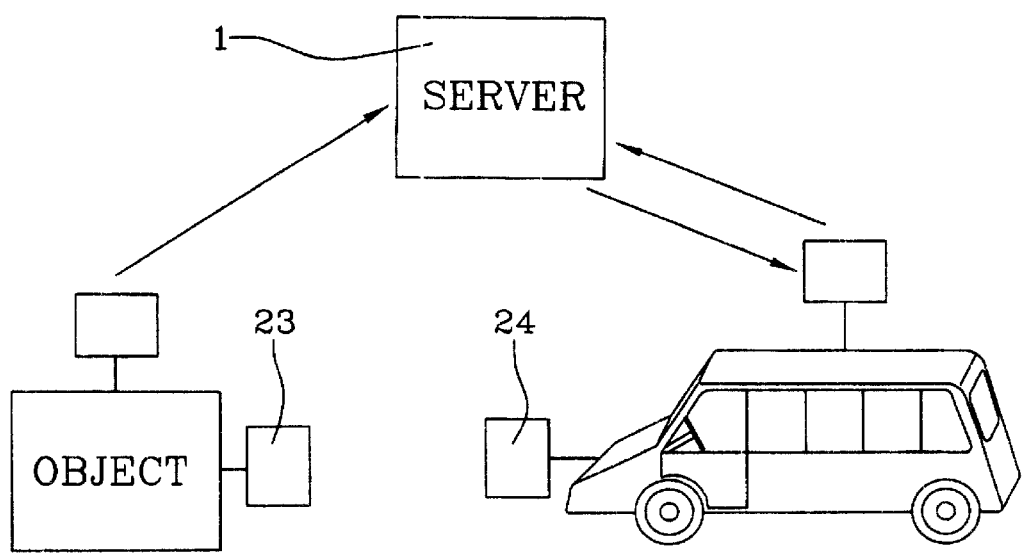
FIG. 4 shows a further embodiment of the inventive system.

FIG. 4 shows another modification of the inventive system. In the system shown in FIG. 4, objects in corresponding zones are provided with location determination allowing means 23, and also the vehicles are provided with location determination allowing means 24. The location determination allowing means 23, 24 can be formed as a receiver and a transmitter correspondingly, or as a receiver/transmitter unit.

Similarly to the first embodiment, the server means 1 transmit in advance to the vehicle a plurality of different informations corresponding to the different zones. When the vehicle in a corresponding zone approaches an object or approaches an area in which the object transmits a signal, the interaction of the location determination allowing means 23, 24 results in a location determining information which is submitted to the server means by transmitting means located either on the vehicle or on the object. In response to the receipt by the server means 1 of the data about the location of the vehicle 2, the server means determine the zone of the vehicle and transmit a signal which does not contain any advertising information, but instead causes in the vehicle the selection and display of an advertising information corresponding to the determined zone of the vehicle. This signal can be also, in another alternative, transmitted to the object and then retransmitted to the vehicle. As in the first embodiment, the signal does not carry any advertising information, but is a coded signal which causes the selection of a corresponding advertising information and its display on the vehicle.

It will be understood that each of the elements described above, or two or more together, may also find a useful application in other types of constructions differing from the types described above.

While the invention has been illustrated and described as embodied in a system of advertising, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A system of advertising, comprising a source of advertising information adapted to transmit advertising information of different contents substantially corresponding to objects to be advertised in different advertising zones and formed as a server means; a plurality of moving vehicles, each of said vehicles being provided with vehicle location determination allowing means adapted to allow determination of a location of a respective one of said vehicles, each of said vehicles being provided with a receiver for receiving the advertising informations of different contents, each of said vehicles being provided with further means for receiving a signal, which does not contain a geographical information, each of said vehicles being provided with a display for displaying advertising information, and said server means being formed so as to determine a zone in which the vehicle is located and therefore a geographic information about a location of the vehicle and to transmit to said further receiving means of the vehicle said signal which does not contain the geographic information without transmitting the geographical information, while said further means in each of said vehicles is formed so as to select in a vehicle based on said signal and to display on said display an advertising information corresponding to said signal with a content which thereby corresponds to the determined zone.

2. A system as defined in claim 1, wherein said further means for receiving a signal is formed so as to receive the signal which also does not contain advertising information, said server means being formed so as to transmit to said further receiving means of the vehicle said signal which also does not contain advertising information.

3. A system as defined in claim 2, wherein said location determination allowing means includes first means provided on each of the vehicles and second means provided on an object located in an advertising zone, so that when a vehicle passes through said advertising zone and said first and second means interact with one another, said server means send said signal to select and display on the vehicle a corresponding advertising information.

4. A system as defined in claim 1, wherein each of said vehicles is provided with means for determining time, and means for displaying an advertising information at the determined time.

5. A system as defined in claim 1, wherein said server means also supply information to said vehicles related to news for displaying the news with a content which corresponds to the determined zone.

6. A system as defined in claim 1, and further comprising means for displaying on said display of each of said vehicles a changeable advertising information when a corresponding vehicle moves with a relatively low speed, while when the corresponding one of the vehicles moves with a higher speed a non-changeable information is displayed on said display.

* * * * *